United States Patent
Chambers et al.

(10) Patent No.: US 7,751,541 B2
(45) Date of Patent: Jul. 6, 2010

(54) COMMUNICATION SETUP METHODS FOR GSM, UMTS AND ISDN PROTOCOLS TO ENABLE PERSONALIZED TELEPHONY AND COMMUNICATION DEVICE INCORPORATING THE SAME

(75) Inventors: Michael J. Chambers, Erlangen (DE); Michael Kiessling, Freising (DE)

(73) Assignee: Agere Systems Inc., Allentown, PA (US)

( * ) Notice: Subject to any disclaimer, the term of this patent is extended or adjusted under 35 U.S.C. 154(b) by 1383 days.

(21) Appl. No.: 11/084,344

(22) Filed: Mar. 18, 2005

(65) Prior Publication Data

US 2006/0209786 A1    Sep. 21, 2006

(51) Int. Cl.
H04M 1/56 (2006.01)
H04M 3/42 (2006.01)

(52) U.S. Cl. .................. 379/142.04; 379/142.17; 455/415

(58) Field of Classification Search ............ 379/142.04, 379/142.06, 142.08, 201.04, 201.05, 211.01, 379/211.05, 221.15, 88.11; 370/351; 455/466, 455/412, 415
See application file for complete search history.

(56) References Cited

U.S. PATENT DOCUMENTS 6,195,347 B1 * 2/2001 Sehgal ..................... 370/354
6,744,868 B2 * 6/2004 Mani ...................... 379/201.02
6,922,721 B1 * 7/2005 Minborg et al. ............. 709/219
7,043,232 B2 * 5/2006 Pelaez et al. .............. 455/412.1
7,349,532 B2 * 3/2008 Henderson ............. 379/142.04
2003/0043974 A1 * 3/2003 Emerson, III ............ 379/88.13
2004/0185885 A1 * 9/2004 Kock .......................... 455/466
2005/0287997 A1 * 12/2005 Fournier ..................... 455/415

FOREIGN PATENT DOCUMENTS

GB            367 723 A      4/2002

* cited by examiner

*Primary Examiner*—Curtis Kuntz
*Assistant Examiner*—Mohammad K Islam

(57) ABSTRACT

A method for setting up a connection between a first communication device and a second communication device, which are connectable by means of a communication network. In one embodiment, the method includes: (1) providing party-defined data, (2) generating a setup message containing the party-defined data, (3) transmitting the setup message from the first communication device to the second communication device, (4) extracting the party-defined data from the received setup message in the second communication device, (5) retrieving output data stored in the second communication device depending on the extracted party-defined data and (6) providing the output data via an output of the second communication device. Communication devices and a communication system are introduced and configured carry out the method.

9 Claims, 8 Drawing Sheets

| INFORMATION CATEGORY | PARAMETER VALUE |
|---|---|
| MOOD OF THE CALLER | 1 |
| URGENCY OF THE CALL | 2 |
| TYPE OF CALL | 3 |
| EXPECTED LENGTH OF CALL | 4 |
| RETRY WHEN REJECTED | 5 |

FIG. 5

| OUTPUT TYPE | PARAMETER VALUE |
|---|---|
| TEXT | 1 |
| PICTURE | 2 |
| ANIMATION | 3 |
| VIDEO SEQUENCE | 4 |
| AUDIO SEQUENCE | 5 |

INFORMATION CATEGORY: MOOD OF THE CALLER (1)
OUTPUT TYPE: TEXT (1)
PARAMETER TRIPLET: (1;1;N)

| INFORMATION | PARAMETER VALUE (N) |
|---|---|
| NORMAL | 1 |
| HAPPY | 2 |
| SAD | 3 |
| ENTHUSIASTIC | 4 |
| STRESSED | 5 |
| INDIFFERENT | 6 |
| ANGRY | 7 |

FIG. 8

INFORMATION CATEGORY: MOOD OF THE CALLER (1)
OUTPUT TYPE: PICTURE (2)
PARAMETER TRIPLET: (1;2;N)

| INFORMATION | PARAMETER VALUE (N) |
|---|---|
| 😐 | 1 |
| 🙂 | 2 |
| 😢 | 3 |
| 😃 | 4 |
| 😰 | 5 |
| 😠 | 6 |
| 😡 | 7 |

# COMMUNICATION SETUP METHODS FOR GSM, UMTS AND ISDN PROTOCOLS TO ENABLE PERSONALIZED TELEPHONY AND COMMUNICATION DEVICE INCORPORATING THE SAME

TECHNICAL FIELD OF THE PRESENT INVENTION

The present invention is directed, in general, to communication and, more specifically, to communication setup methods using GSM, UMTS or ISDN protocols that enable new personalized telephony services and a communication device incorporating the same.

BACKGROUND OF THE PRESENT INVENTION

When one person (a "calling party") calls another (a "called party"), all that is initially conveyed is the desire to contact the called party. The reason for the call, its urgency, the calling party's current mood or attitude or any other information that may attract the called party's attention is not conveyed.

Many mobile telephones are provided with a telephone book, in which names, telephone numbers and even associated pictures for a plurality of persons can be stored. If the communication network transmits the calling party's telephone number to the calling party's mobile telephone and assuming the called party's mobile telephone contains the calling party's information, that mobile telephone can display the calling party's associated name and/or picture when the calling party calls.

Great Britain Patent No. GB 2367723 A, as one example, teaches that a selected ring tone, vibrator setting or even voice information can be associated with entries in the telephone book of a mobile telephone, thereby enabling the party to identify the calling party without having to look at the display.

However, these and other prior art methods are static and can only be used for identifying the calling party. They do not provide any more information from the calling party, such as for instance about the nature or the urgency of the call or any other call-specific information.

Therefore, what is needed in the art is a new and improved approach to personalized telephony and, in particular, a communication device and associated method that employ a novel communication setup method to convey call-specific calling party information.

SUMMARY OF THE PRESENT INVENTION

To address the above-discussed deficiencies of the prior art, the present invention provides, in one aspect, a method of setting up a connection between a first communication device and a second communication device. In one embodiment, the method includes providing first party-defined data, defined by the party of the first communication device, generating a setup message for requesting connection setup, the setup message containing the first party-defined data, transmitting the setup message from the first communication device to the second communication device via the communication network. The method further includes extracting the first party-defined data from the received setup message in the second communication device, retrieving first output data stored in the second communication device depending on the extracted first party-defined data, and providing the first output data to the called party via an output of the second communication device.

In another aspect, the present invention provides a communication device configured to send personalized telephony messages. In one embodiment, the communication device includes a memory unit, a party interface for providing party-defined data, a message generator configured to generate a setup message containing the party-defined data, and a transmitter configured to transmit the setup message to a communication network. The party interface may be configured to allow a calling party to select at least one data item from a plurality of data items stored in the memory unit.

In yet another aspect, the present invention provides a communication device configured to receive personalized telephony messages and having a memory unit configured to store output data, an evaluation circuit configured to extract party-defined data from a setup message received from a communication network, a controller configured to retrieve stored output data depending on the received party-defined data, and an output configured to provide retrieved output data to a called party. The output may include a display, a speaker, a vibrator or any combination of these. At least one output data item stored in the memory unit of the communication device may be identifiable by a parameter set extractable from the party-defined data.

In still another aspect, the present invention provides a communication system. In one embodiment, the communication system includes first and second communication devices and a communication network, to which the first and second communication devices are connectable. The first communication device is at least configured to send personalized telephony messages, and the second communication device is at least configured to receive personalized telephony messages in the way described above.

The foregoing has outlined illustrated and alternative features of the present invention so that those skilled in the art may better understand the detailed description of the present invention that follows. Additional features of the present invention will be described hereinafter that form the subject of the claims of the present invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the present invention.

BRIEF DESCRIPTION OF THE DRAWINGS

For a more complete understanding of the present invention, reference is now made to the following descriptions taken in conjunction with the accompanying drawing, in which:

FIG. 5 illustrates a table with exemplary parameter values for the information category associated with FIG. 4A;

FIG. 6 illustrates a table with exemplary parameter values for the output type associated with FIG. 4B;

FIG. 7 illustrates a table with exemplary parameter values for pieces of information of output type text associated with FIG. 4C;

FIG. 8 illustrates a table with exemplary parameter values for pieces of information of output type picture associated with FIG. 4C.

DETAILED DESCRIPTION

Figure 1:
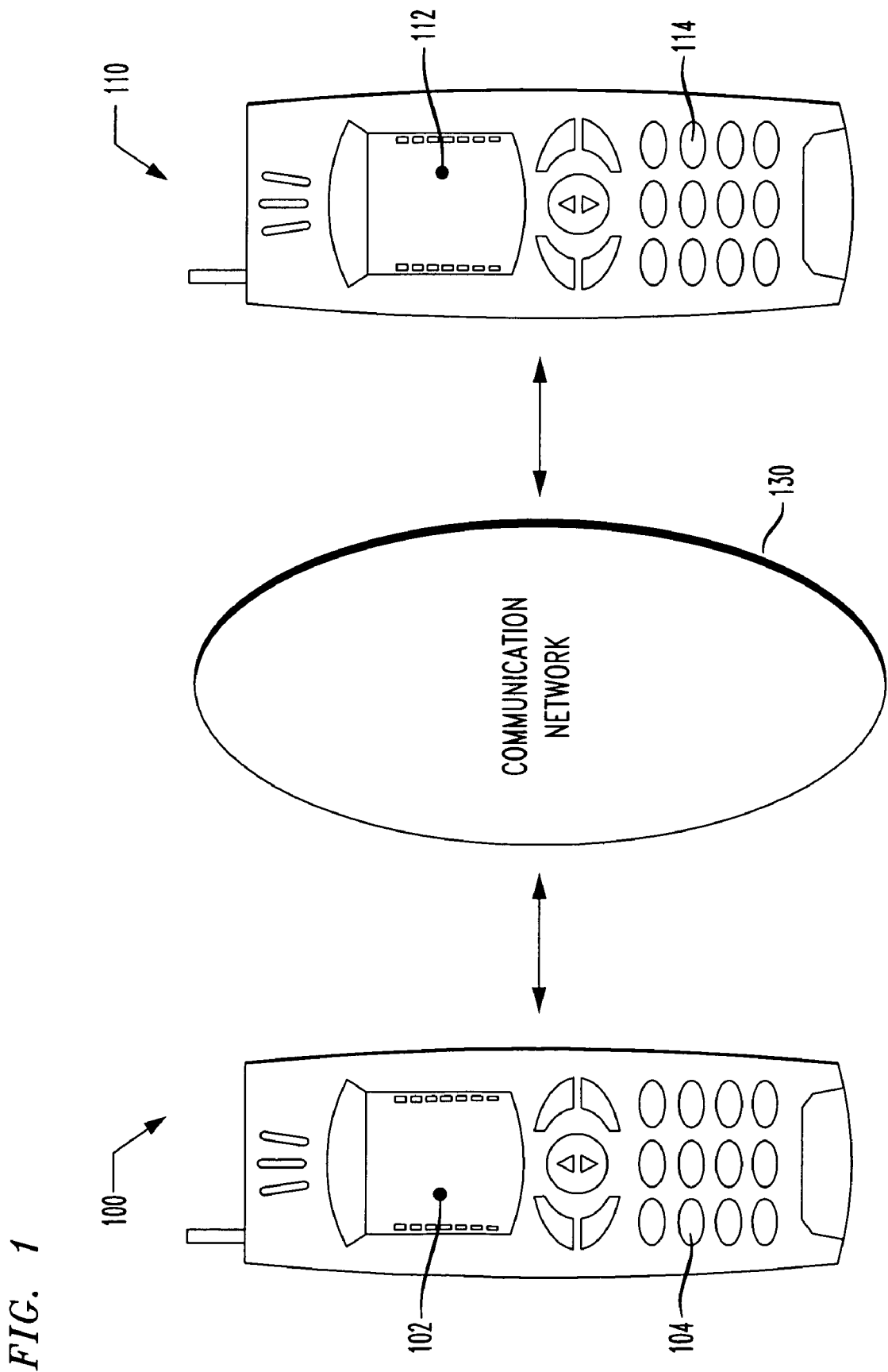
FIG. 1 illustrates a schematic view of a first embodiment of a communication system configured to support communication setup methods carried out according to the principles of the present invention.

Before describing the FIGUREs directly, various aspects, embodiments and features of the present invention will be described. One aspect of the present invention is directed to a method for setting up a connection between a first communication device and a second communication device, which are connectable by means of a communication network.

In one embodiment, the method includes providing first party-defined data, defined by the party of the first communication device, generating a setup message for requesting connection setup, the setup message containing the first party-defined data, transmitting the setup message from the first communication device to the second communication device via the communication network. The method further includes extracting the first party-defined data from the received setup message in the second communication device, retrieving first output data stored in the second communication device depending on the extracted first party-defined data, and providing the first output data to the called party via an output of the second communication device.

This aspect of the present invention thereby enables a calling party to include extra information in the call-setup message that is transported to the called party. The call-setup message thus becomes a personalized telephony message. The term "personalized telephony message" is defined to encompass any message sent from a first communication device to a second communication device via a communication network that contains party-defined data. The received information is used to provide output data to the called party before he accepts the call. The output data may include text, a picture, animation, a video sequence, an audio sequence or any combination of these. In this way, more accurate information can be sent from a calling party to a called party about the call, thereby helping the called party to decide whether to accept or to refuse the call.

Further, the present invention may be employed to advantage in the context of advertisement notification. It is possible that companies advertising by telephone will be required by law to announce themselves so called parties can make informed decisions as to whether to accept the call. In such circumstances, the company will have to set an "advertisement" flag in its personalized call setup.

Advantageously, the communication network can, by means of which the communication devices are connected, support at least one of GSM (Global System for Mobile Communications), UMTS (Universal Mobile Telecommunications System) or ISDN (Integrated Service Digital Network) protocols, since in the call-setup portions of these protocols, it is possible to include USER-USER data in the signaling messages between the network, the calling device and the called device. Therefore, the transmitting of the setup message containing the first party-defined data may include transmitting a setup message containing a USER-USER data element according to GSM, UMTS or ISDN protocols.

According to the standards, for GSM for instance defined in ETSI EN 300 940 V6.8.1 (GSM 04.08 version 6.8.1 Release 1997), the USER-USER data element is restricted to a maximum size of between 35 and 131 bytes. This is enough to transport coded information that can be used in the called device to retrieve larger data files stored locally, for instance a picture, animation, text or a video or audio sequence. The present invention is not limited, however, to GSM, UMTS or ISDN, but also contemplates any existing or later-developed communication network or protocol and corresponding communication devices. One example is Voice-over-Internet-Protocol (VoIP), a communication protocol based on IP can be used to transmit personalized telephony messages at any time without being restricted to the size of USER-USER data elements in the signaling messages. Accordingly, the communication network can also be the Internet.

Due to the restricted size of USER-USER data elements according to the above described standards, the extra information that is transported by the communication network should, but not need, be made as small as possible. Therefore, to transform the information the calling party wants to transmit to the called party into coded information of minimum size, the providing of the first party-defined data may include selecting at least one data item from a plurality of data items stored in the first communication device and generating a parameter set identifying the at least one selected data item. The first party-defined data is thus provided as the parameter set.

For practical purposes, the data that is to be provided to the called party can also be identified by the parameter set. Accordingly, the parameter set may advantageously be associated with at least one output data item stored in the second communication device.

The data files containing the pictures, animations, texts or video or audio sequences, which are to be provided by the called device to the called party (as perhaps the corresponding parameter sets and the information to be displayed to the calling party for selecting a parameter set to be transmitted) may for instance be provided by the application provider or the network provider to a plurality of subscribers of the application or network.

Since the described embodiment of the method for connection setup is open to abuse, each party can optionally select the set of calling parties from whom to accept personalized telephony messages. Another option is a black list of parties from whom the personalized telephony messages are not to be accepted. Accordingly, the inventive method may further includes the steps of storing a list of telephone numbers corresponding to communication devices, from which party-defined data is accepted, in a memory unit of the second device, transmitting the telephone number of the first device when requesting connection setup, detecting the telephone number of the first device by the second device and comparing the detected telephone number with the telephone numbers in the stored list, wherein the steps of retrieving and providing first output data are performed depending on whether the detected telephone number matches a telephone number in the stored list.

If the called party refuses the call, he may, for example, give a reason for the rejection, perhaps using his own personalized telephony message. This could be conveyed to the calling device in the disconnect message. Therefore, the method with may include generating a disconnect message for rejecting the request for connection setup, the disconnect message containing second party-defined data defined by the party of the second communication device, transmitting the disconnect message from the second communication device to the first communication device via the communication network, extracting the second party-defined data from the received disconnect message in the first communication device, retrieving second output data stored in the first communication device depending on the extracted second party-defined data, and providing the second output data to the calling party via an output of the first communication device.

The present invention further introduces a communication device configured to send personalized telephony messages having a memory unit, a party interface for providing party-defined data, a message generator configured to generate a setup message containing the party-defined data, and a transmitter configured to transmit the setup message to a communication network. The party interface may be configured to allow a calling party to select at least one data item from a plurality of data items stored in the memory unit.

To also receive personalized telephony messages, the called communication device may further include an evaluation circuit configured to extract party-defined data from a setup message received from a communication network, a controller configured to retrieve stored output data depending on the received party-defined data, and an output configured to provide retrieved output data.

For providing typical output data such as pictures, animations, texts or video or audio sequences, the output may include a display or a speaker. The output may include a vibrator for selectively activating vibration of the communication device.

In another aspect, the present invention is directed to a communication device configured to receive personalized telephony messages and having a memory unit configured to store output data, an evaluation circuit configured to extract party-defined data from a setup message received from a communication network, a controller configured to retrieve stored output data depending on the received party-defined data, and an output configured to provide retrieved output data to a called party. The output may include a display, a speaker, a vibrator or any combination of these. At least one output data item stored in the memory unit of the communication device may be identifiable by a parameter set extractable from the party-defined data.

For sending a personalized telephony message back to the calling party when rejecting the call, the communication device may further include a party interface configured to provide party-defined data, a message generator configured to generate a disconnect message for rejecting a requested connection setup with a second communication device, the disconnect message containing the party-defined data, and a transmitter configured to transmit the disconnect message to a communication network.

To enable the party of the communication device to select a number of calling parties from whom to accept personalized telephony messages, the device may further include a memory unit configured to store at least one telephone number, a detection circuit configured to detect the telephone number of a calling device and a comparison circuit configured to compare the detected telephone number with the at least one telephone number stored in the memory unit.

The present invention is not limited to a certain type of communication device, but encompasses telephones, mobile telephones, fax machines, personal digital assistants (PDAs) or mobile digital assistants (MDAs), as well as accordingly equipped computers or any other existing or later-developed communication devices.

A further aspect of the present invention is a communication system. In one embodiment, the communication system includes first and second communication devices and a communication network, to which the first and second communication devices are connectable. The first communication device is at least configured to send personalized telephony messages, and the second communication device is at least configured to receive personalized telephony messages in the way described above.

Having described several different aspects of the present invention, reference will now be made to the FIGS. Therefore, referring initially to FIG. 1, illustrated is an exemplary embodiment of an inventive communication system, including a first mobile telephone 100 and a second mobile telephone 110, that are connectable by means of a communication network 130. The mobile telephones 100 and 110 are each provided with a party interface including respective displays 102, 112 and keypads 104, 114 respectively. The communication network 130 and the first and second mobile telephones 100, 110 can, for example, be configured to support the GSM or UMTS communication protocol.

Figure 2:
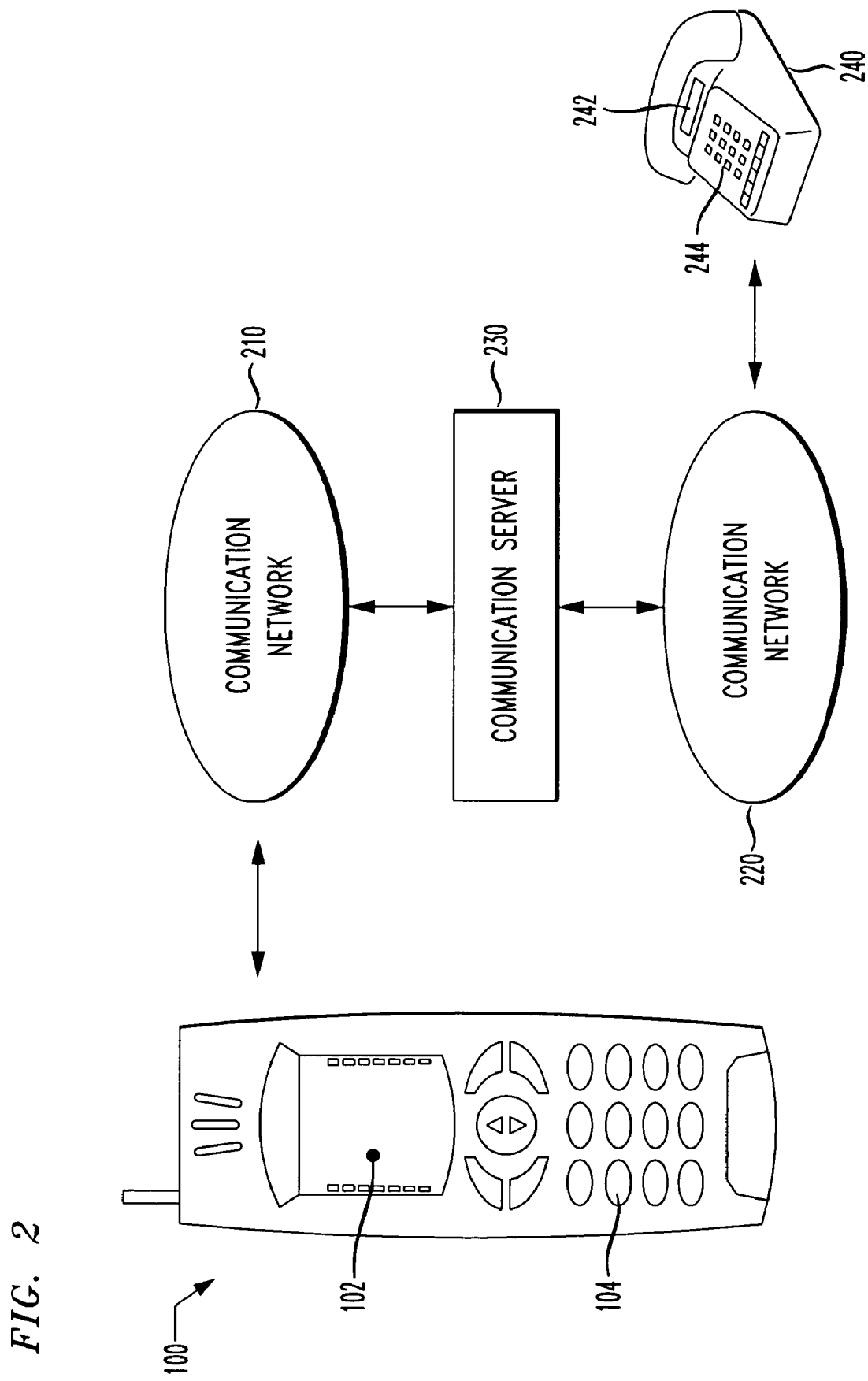
FIG. 2 illustrates a schematic view of a second embodiment of a communication system configured to support communication setup methods carried out according to the principles of the present invention.

Turning now to FIG. 2, illustrated is another embodiment of an inventive communication system, including the mobile telephone 100 of FIG. 1 and an ISDN telephone 240, which also is provided with a display 242 and a keypad 244 as party interface. In this embodiment, the communication network, by which the mobile telephone 100 and the telephone 240 are connectable, includes two communication networks 210, 220 and a communication server 230. The communication network 210, in this embodiment, is a cellular network supporting GSM, to which the mobile telephone 100 is connectable, and the communication network 220 is a telephone network supporting ISDN, to which the ISDN telephone 240 is connected. For data conversion between communication networks 210, 220, the communication server 230 is provided with a suitable integrated converter.

Figure 3:
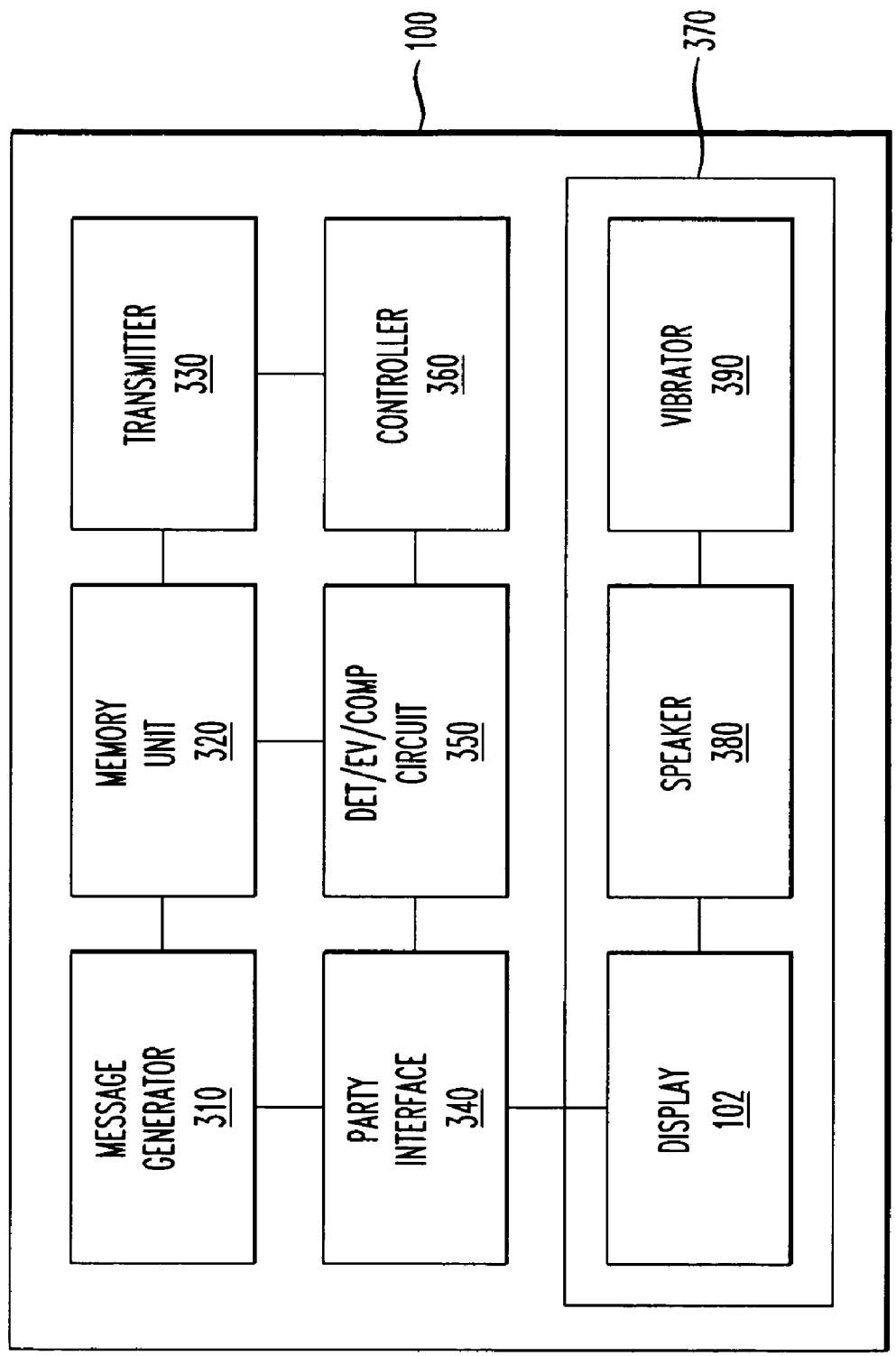
FIG. 3 illustrates a high level block diagram of one embodiment of the communication device of FIG. 1.

Turning now to FIG. 3, illustrated is a high level block diagram of one embodiment of the communication device of FIG. 1. A message generator 310 is configured to generate a setup message for requesting connection setup with a second communication device, the setup message containing the party-defined data. The message generator 310 is also configured to generate a disconnect message for rejecting a requested connection setup with a second communication device, the disconnect message containing the party-defined data.

A memory unit 320 is coupled to the message generator 310 and is configured to store at least one telephone number. A transmitter 330 is coupled to the memory unit 320 and is configured to transmit the setup message or the disconnect message to a communication network.

A party interface 340 is coupled to the transmitter 330 and is configured to provide party-defined data. The party interface ostensibly includes the keyboard 104 of FIG. 1.

A detection/evaluation/comparison circuit 350 is coupled to the party interface 340 and is configured to detect a telephone number of a calling device, further configured to extract party-defined data from a setup message received from a communication network and still further configured to compare the detected telephone number with the at least one telephone number stored in the memory unit.

A controller 360 is coupled to the detection/evaluation/comparison circuit 350 and is configured to retrieve stored output data depending on the received party-defined data. The controller 360 is further configured to retrieve stored output data depending on the received party-defined data.

An output 370 is coupled to the controller 360 and is configured to provide retrieved output data to the party. The output 370 may include the display 102 of FIG. 1 and may also include a speaker 380 or a vibrator 390.

In the following, an exemplary course of actions for transmitting a personalized telephony message is described with regard to FIGS. 4A-4D. The calling party enters the number to be called via the keypad 102 of the mobile telephone 100 and presses an appropriate key on the keypad 102 to initiate the call. If personalized telephony is enabled on the mobile telephone 100, the party is requested to enter the personalized telephony information via the keypad 102, wherein the type of information may of course vary from party to party. Some examples are the reason or the urgency of the call, the expected length of the call, whether it is a private or business call or whether the calling party would retry if the call is not answered.

Figure 4A:
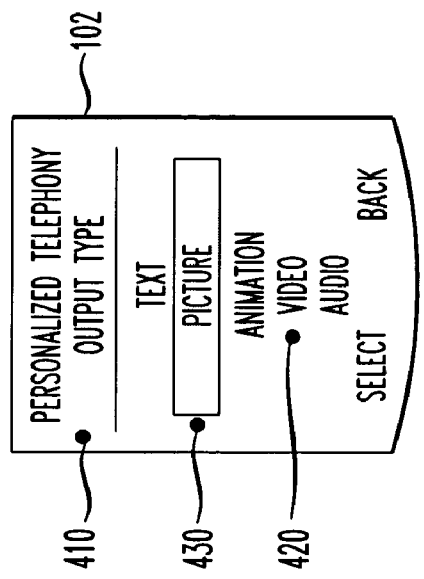
FIG. 4A illustrates a display of a communication device during the process of selecting an information category.
Figure 4B:
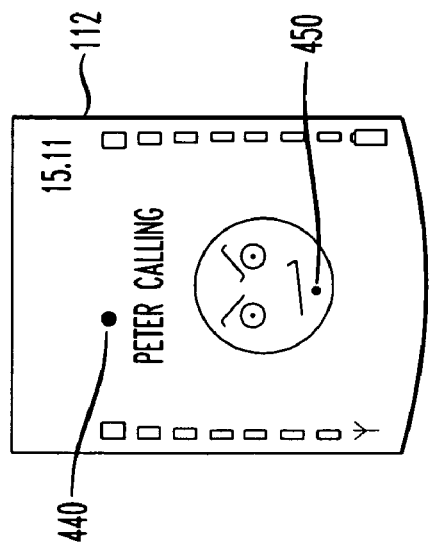
FIG. 4B illustrates a display of a first communication device during the process of selecting an output type.
Figure 4C:
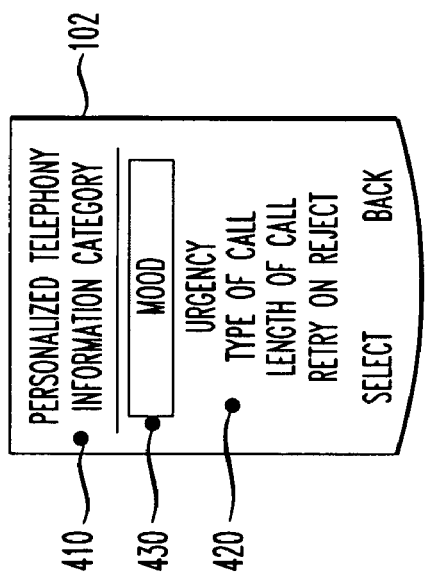
FIG. 4C illustrates a display of a first communication device during the process of selecting information to be transmitted to a second communication device.

Exemplary steps for entering personalized telephony information are shown in FIGS. 4A-4C. In every step, a selection can be made indicated by the according selection heading 410 displayed on the display 102. In the first step, shown in FIG. 4A, the calling party can select an information category from a list including a number of entries 420. When the entry to be selected is highlighted 430, the calling party confirms it by pressing an appropriate key. In the same way, as shown in FIGS. 4B and 4C, the calling party selects output type and actual information of the personalized telephony information by choosing an item from a list.

For transmitting the personalized telephony information a USER-USER data field according to GSM standards is employed. Due to the limited size of the USER-USER data field, the personalized telephony information does not contain the actual data to be provided to the called party by the called device, but rather coded information identifying at least one output data item stored in the called device. The coded information is incorporated in the USER-USER data field of the SETUP message, which is sent to the communication network according to GSM standards. The communication network attaches this USER-USER data to the SETUP message sent to the called device. If the called device supports personalized telephony, it extracts the USER-USER data and outputs the associated output data, e.g., a picture, an animation or a text, to the party while the mobile is ringing.

Figure 4D:
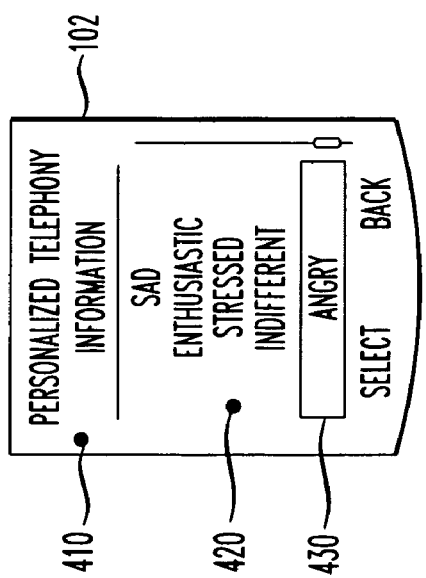
FIG. 4D illustrates a display of a second communication device displaying output data according to information received from a first communication device.

An example for providing output data is shown in FIG. 4D. In this example, on receiving the SETUP message from the communication network, the name 440 of the calling party retrieved from an integrated telephone book is shown on the display 112 of the called device and, additionally, the personalized telephony information is shown as a picture of an angry face 450, this picture being retrieved from a memory unit of the called device based on the received USER-USER data according to the selection (mood, picture, angry) made by the calling party as shown in FIGS. 4A-4C.

The called party now can decide whether to accept or to refuse the call taking into account the additional output data. If the called party refuses the call, he can give a reason for the reject also using personalized telephony according to the present invention. For this purpose, corresponding personalized telephony information is incorporated into the USER-USER data field of the DISCONNECT message, which is transmitted back to the calling communication device. The SETUP and DISCONNECT messages are defined for GSM in ETSI EN 300 940 V6.8.1 (GSM 04.08 version 6.8.1 Release 1997).

An example for coded information to be incorporated in the USER-USER data field of a SETUP message, the coded information including at least one parameter set with three parameters, is given in tables 500, 600, 800, 800, shown in FIGS. 5-8.

In this embodiment the information category of the personalized telephony information to be transmitted is defined by the first of the three parameters. According parameter values for this first parameter are shown in FIG. 5 in the table 500. The output type is defined by the second parameter, wherein the possible parameter values can depend on the value of the first parameter. An example of output types and corresponding values of the second parameter are shown in FIG. 6 in the table 600. By the third parameter the actual information is defined. The possible values of the third parameter depend on the values of the first and second parameters. In FIG. 7 in the table 700 exemplary parameter values for the third parameter are shown for the case that the first parameter has a value of 1, defining the mood of the calling party as the information category and the second parameter has a value of 1, defining text as output type. In FIG. 8 in the table 800 exemplary parameter values for the third parameter are shown for the case that the first parameter has a value of 1, defining the mood of the calling party as the information category and the second parameter has a value of 2, defining picture as output type.

Several parameter triplets can be combined so that, for instance, the personalized telephony information transmitted can include the triplets (1, 2, 7) and (2, 3, 1), resulting on the called device in the display of the mood picture showing an angry face and in the parallel display of the urgency animation indicating that the urgency is very high.

Figure 9:
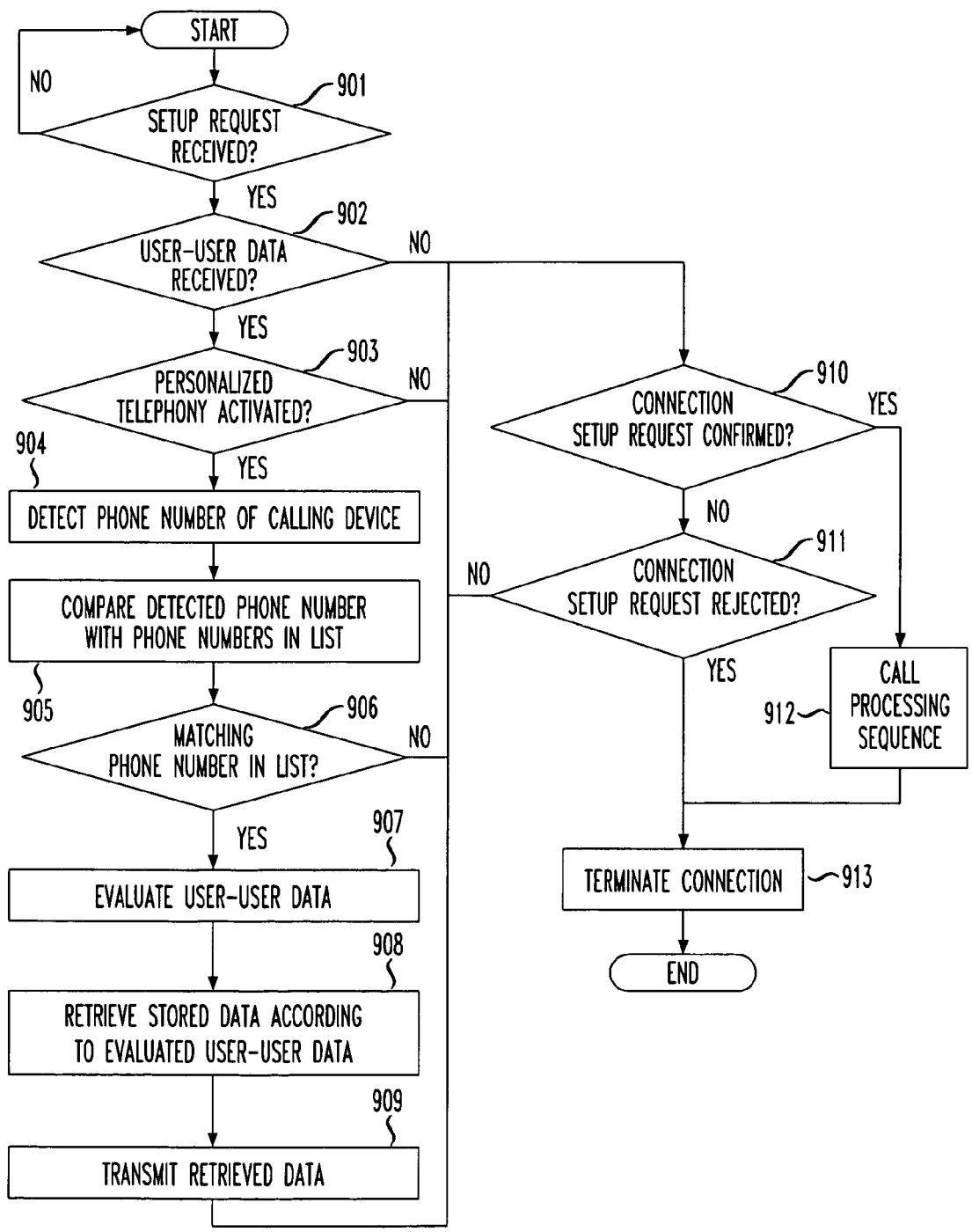
FIG. 9 illustrates a flow diagram of one embodiment of a course of actions carried out in accordance with the principles of the present invention.

Turning now to FIG. 9, illustrated is a flow diagram of a course of actions on a called mobile telephone supporting GSM standards according to one embodiment of the inventive method.

The mobile telephone repeatedly checks whether a connection setup request is received in a step 901. When a connection setup request is received, it is checked whether the USER-USER data field of the received connection setup message contains data in a step 902. If USER-USER data is received and personalized telephony is activated in a step 903, the telephone number of the calling device is detected in a step 904. The detected telephone number is compared to telephone numbers in a list in a step 905, wherein the list is stored in the mobile telephone and contains telephone numbers of devices from which personalized telephony messages are accepted. If a telephone number matching the detected telephone number is found in the list in a step 906, the received USER-USER data is evaluated in a step 907 and data stored in the mobile telephone is retrieved according to the evaluated USER-USER data in a step 908. For this purpose the USER-USER data for instance can include one or more parameter triplets as described above with respect to FIGS. 5-8. The retrieved data is provided to the called party by the mobile telephone, for instance displayed on the display screen or replayed by means of a speaker.

After output of the retrieved data or without output of additional data if no USER-USER data is received, personalized telephony is not activated or no telephone number matching the detected telephone number is found in the list, it is repeatedly checked whether the connection setup request is confirmed in a step 910 or rejected in a step 911 by appropriate called party input. Confirmation of the connection setup request is followed by a normal call processing sequence in a step 912. After call processing or when the connection setup request is rejected, the connection is terminated in a step 913.

Although the present invention has been described in detail, those skilled in the art should understand that they can make various changes, substitutions and alterations herein without departing from the spirit and scope of the present invention in its broadest form.

What is claimed is:

1. A method of setting up a connection between a first communication device and a second communication device, which are connectable by means of a communication network, comprising:
   providing first party-defined data, defined by said party of said first communication device, wherein said providing first party-defined data comprises:
      selecting at least one data item from a plurality of data items stored in said first communication device; and
      generating a parameter set identifying said at least one selected data item, said first party-defined data being provided as said parameter set;
   generating a setup message for requesting connection setup, said setup message containing said first party-defined data;
   transmitting said setup message from said first communication device to said second communication device via said communication network;
   extracting said first party-defined data from said received setup message in said second communication device;
   retrieving output data stored in said second communication device depending on said extracted first party-defined data; and
   providing said output data stored in said second communication device via an output of said second communication device.

2. The method as recited in claim 1 wherein said communication network supports at least one of:
   GSM,
   UMTS and
   ISDN protocols.

3. The method as recited in claim 2 wherein said transmitting said setup message containing first party-defined data includes transmitting a setup message containing a party-user data element according to GSM, UMTS or ISDN protocols.

4. The method as recited in claim 1 wherein said communication network is the Internet.

5. The method as recited in claim 1 wherein said parameter set is associated with at least one output data item stored in said second communication device.

6. The method as recited in claim 1 wherein said first output data includes at least one of:
   text,
   a picture,
   animation,
   a video sequence, and
   an audio sequence.

7. The method as recited in claim 1, further comprising:
   storing a list of telephone numbers corresponding to communication devices, from which party-defined data is accepted, in a memory unit of said second communication device;
   transmitting said telephone number of said first device when requesting connection setup;
   detecting said telephone number of said first device by said second device; and
   comparing said detected telephone number with said telephone numbers in said stored list, said retrieving and outputting first output data being performed depending on whether said detected telephone number matches a telephone number in said stored list.

8. The method as recited in claim 1 further comprising:
   generating a disconnect message for rejecting said request for connection setup, said disconnect message containing second party-defined data, defined by said party of said second communication device;
   transmitting said disconnect message from said second communication device to said first communication device via said communication network;
   extracting said second party-defined data from said received disconnect message in said first communication device;
   retrieving second output data stored in said first communication device depending on said extracted second party-defined data; and
   providing said second output data via an output device of said first communication device.

9. A communication system, comprising:
   a first communication device, including:
      a party interface configured to generate a parameter set identifying at least one data item selected from a plurality of data items stored in a memory unit of said first communication device, said parameter set providing party-defined data,
      a message generator coupled to said party interface and configured to generate a setup message for requesting connection setup with a second communication device, said setup message containing said party-defined data, and
      a transmitter coupled to said message generator and configured to transmit said setup message to a communication network;
   a second communication device, including:
      an evaluation circuit configured to extract party-defined data from a setup message received from a communication network,
      a controller coupled to said evaluation circuit and configured to retrieve output data stored in said second communication device depending on said received party-defined data, and
      an output device coupled to said controller and configured to provide said retrieved output data stored in said second communication device; and
   a communication network, to which said first and second communication devices are connectable.

* * * * *